(12) United States Patent
Muhammad et al.

(10) Patent No.: US 11,695,445 B2
(45) Date of Patent: Jul. 4, 2023

(54) EQUALIZER ASSISTED POLYNOMIAL BASED LINEARITY ENHANCEMENT AND SELF-INTERFERENCE CANCELER

(71) Applicant: Samsung Electronics Co., Ltd., Suwon-si (KR)

(72) Inventors: Khurram Muhammad, Southlake, TX (US); Yu Liu, Allen, TX (US); Chance Tarver, Euless, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/389,258

(22) Filed: Jul. 29, 2021

(65) Prior Publication Data

US 2022/0045713 A1 Feb. 10, 2022

Related U.S. Application Data

(60) Provisional application No. 63/061,948, filed on Aug. 6, 2020.

(51) Int. Cl.
| | | |
|---|---|---|
| *H04B 1/525* | (2015.01) | |
| *H04L 5/14* | (2006.01) | |
| *H04B 1/04* | (2006.01) | |
| *H04B 1/18* | (2006.01) | |
| *H04B 1/10* | (2006.01) | |

(52) U.S. Cl.
CPC ............ *H04B 1/525* (2013.01); *H04B 1/0475* (2013.01); *H04B 1/1081* (2013.01); *H04B 1/18* (2013.01); *H04L 5/143* (2013.01); *H04B 2001/0425* (2013.01); *H04B 2001/0433* (2013.01)

(58) Field of Classification Search
CPC ...... H04B 1/0475; H04B 1/1081; H04B 1/18; H04B 1/525; H04B 2001/0425; H04B 2001/0433; H04L 5/143
See application file for complete search history.

(56) References Cited

U.S. PATENT DOCUMENTS

| | | |
|---|---|---|
| 7,173,966 B2 | 2/2007 | Miller |
| 7,869,527 B2 | 1/2011 | Vetter et al. |
| 8,204,142 B2 | 6/2012 | Hwang et al. |

(Continued)

FOREIGN PATENT DOCUMENTS

| | | |
|---|---|---|
| EP | 2862326 B1 | 3/2021 |
| JP | H0865213 A | 3/1996 |

(Continued)

OTHER PUBLICATIONS

International Search Report and Written Opinion of the International Searching Authority in connection with International Application No. PCT/KR2021/010451 dated Nov. 10, 2021, 7 pages.

*Primary Examiner* — Nguyen T Vo

(57) ABSTRACT

A cross-division duplex (XDD) system includes an apparatus having a transceiver configured to communicate via an uplink channel and a downlink channel concurrently. The apparatus also includes a transmit antenna, a receive antenna, and a processor. The processor is configured to: estimate a non-linear component corresponding to a transmit path in the transceiver; apply an equalizer function to a received signal; and subtract, in a self-interference cancel (SIC) circuitry, the estimated non-linear component from the equalized signal.

20 Claims, 8 Drawing Sheets

(56) References Cited

U.S. PATENT DOCUMENTS

| | | | |
|---|---|---|---|
| 8,718,178 B1* | 5/2014 | Carbone | H03F 1/3241 |
| | | | 375/296 |
| 9,369,217 B1* | 6/2016 | Jakoby | H04B 15/00 |
| 9,787,459 B2 | 10/2017 | Azadet | |
| 10,291,384 B2 | 5/2019 | Askar et al. | |
| 10,404,315 B2 | 9/2019 | Lee et al. | |
| 10,484,040 B2 | 11/2019 | Lim et al. | |
| 2005/0013353 A1 | 1/2005 | Alloin | |
| 2011/0116403 A1* | 5/2011 | Kahrizi | H04B 1/30 |
| | | | 370/252 |
| 2013/0044791 A1* | 2/2013 | Rimini | H04B 1/525 |
| | | | 375/219 |
| 2016/0285486 A1* | 9/2016 | Qin | H04B 1/123 |
| 2017/0033915 A1* | 2/2017 | McCoy | H03F 1/3247 |
| 2018/0076847 A1* | 3/2018 | Ju | H04L 25/0224 |
| 2018/0131502 A1* | 5/2018 | Askar | H04B 1/123 |
| 2020/0343934 A1 | 10/2020 | Weissman et al. | |
| 2021/0184723 A1* | 6/2021 | Brighenti | H04B 17/354 |

FOREIGN PATENT DOCUMENTS

| | | |
|---|---|---|
| KR | 10-2016-0131400 A | 11/2016 |
| KR | 10-2018-0093971 A | 8/2018 |
| KR | 10-2054840 B1 | 12/2019 |

* cited by examiner

EQUALIZER ASSISTED POLYNOMIAL BASED LINEARITY ENHANCEMENT AND SELF-INTERFERENCE CANCELER

CROSS-REFERENCE TO RELATED APPLICATIONS AND CLAIM OF PRIORITY

The present application claims priority to U.S. Provisional Patent Application No. 63/061,948, filed on Aug. 6, 2020. The content of the above-identified patent document is incorporated herein by reference.

TECHNICAL FIELD

The present disclosure relates generally to wireless communication systems and, more specifically, the present disclosure relates to an equalizer assisted polynomial based linearity enhancement and self-interference canceler.

BACKGROUND

Traditionally, modern cellular communication systems operate within two main modes; Time Division Duplexing (TDD) and Frequency Division Duplexing (FDD). There are several tradeoffs between TDD and FDD systems. TDD systems split uplink (UL) and downlink (DL) in the time domain, while FDD systems split uplink and downlink in frequency domain. Therefore, UL in TDD system operates at a duty cycle (less than 100% of time) while UL in FDD system operates 100% of time but requires a separate band. Furthermore, FDD system requires isolation between transmit (TX) and receive (RX) as both are operated simultaneously. The isolation is achieved using duplexers and/or separate antennas

SUMMARY

The present disclosure relates to wireless communication systems and, more specifically, the present disclosure relates to an equalizer assisted polynomial based linearity enhancement and self-interference canceler.

In one embodiment, an apparatus is provided. The apparatus includes a transceiver configured to communicate via an uplink channel and a downlink channel concurrently. The apparatus also includes a transmit antenna, a receive antenna, and a processor. The processor is configured to: estimate a non-linear component corresponding to a transmit path in the transceiver; apply an equalizer function to a received signal; and subtract, in a self-interference cancel (SIC) circuitry, the estimated non-linear component from the equalized signal.

In another embodiment, a method is provided. The method includes transmitting, by a transceiver configured to transmit an uplink channel and a downlink channel concurrently, one or more signals, the transceiver coupled to a transmit antenna and a receive antenna. The method also includes estimating a non-linear component corresponding to a transmit path in the transceiver. The method also includes applying an equalizer function to a received signal. The method further includes subtracting, in a self-interference cancel (SIC) circuitry, the estimated non-linear component from the equalized signal.

In yet another embodiment, a non-transitory computer readable medium is provided. The non-transitory computer readable medium a plurality of instructions that, when executed by at least one processor, cause the processor to transmit, via a transceiver configured to communicate via an uplink channel and a downlink channel concurrently, one or more signals, the transceiver coupled to a transmit antenna and a receive antenna. The instructions further cause the processor to: estimate a non-linear component corresponding to a transmit path in the transceiver; apply an equalizer function to a received signal; and subtract, in a self-interference cancel (SIC) circuitry, the estimated non-linear component from the equalized signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

As indicated herein above, modern cellular communication systems operate within two main modes; Time Division Duplexing (TDD) and Frequency Division Duplexing (FDD) and there are several tradeoffs between TDD and FDD systems. Additionally, mobile terminals, such as user equipments (UEs) have limited output power, which can be 23 dBm in cellular communication links. The limited output power of the UEs can constrain the coverage as the uplink (UL) power is distributed across an entire bandwidth (BW) for an allocated proportion of time. The power spectral density of output power is lower and reaches a lower distance; thereby, causing a lower coverage range, which can be an issue with cell site planning as more base stations are required to cover an area. TDD systems are simpler to implement have the advantage of using just one chunk of band for both UL and downlink (DL). TDD does not required paired bands for operation as TDD can use the entire band.

Embodiments of the present discloser provide a transceiver architecture that is configured to remove a leakage value, which occurs from a transmit signal, from a received signal. Certain embodiments of the present disclosure provide equalizer circuit before a self-interference canceler to alleviate a frequency response introduce by a channel distortion occurring between a transmit antenna and a receive antenna.

Figure 1:
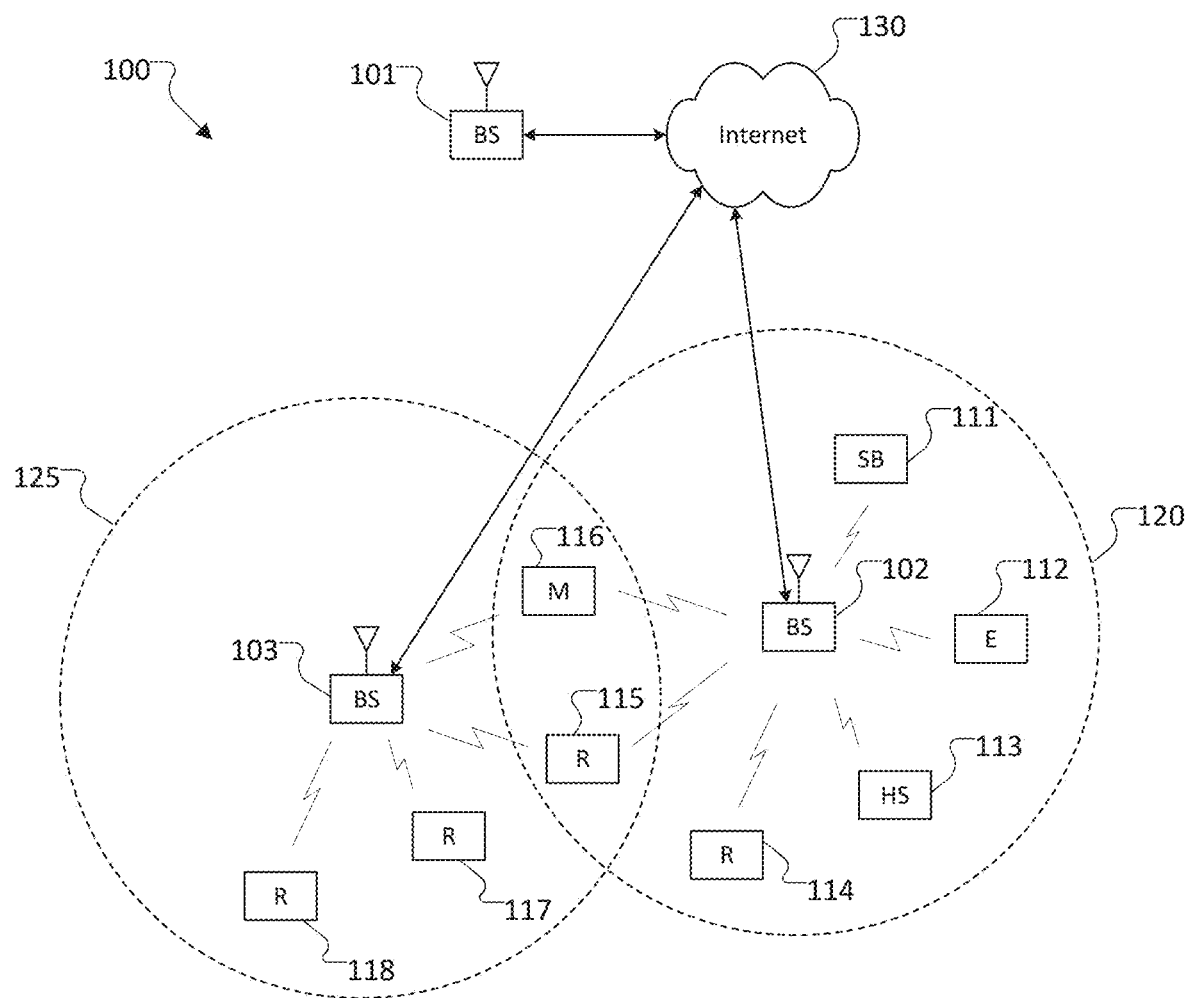
FIG. 1 illustrates an example wireless network according to embodiments of the present disclosure.
Figure 2:
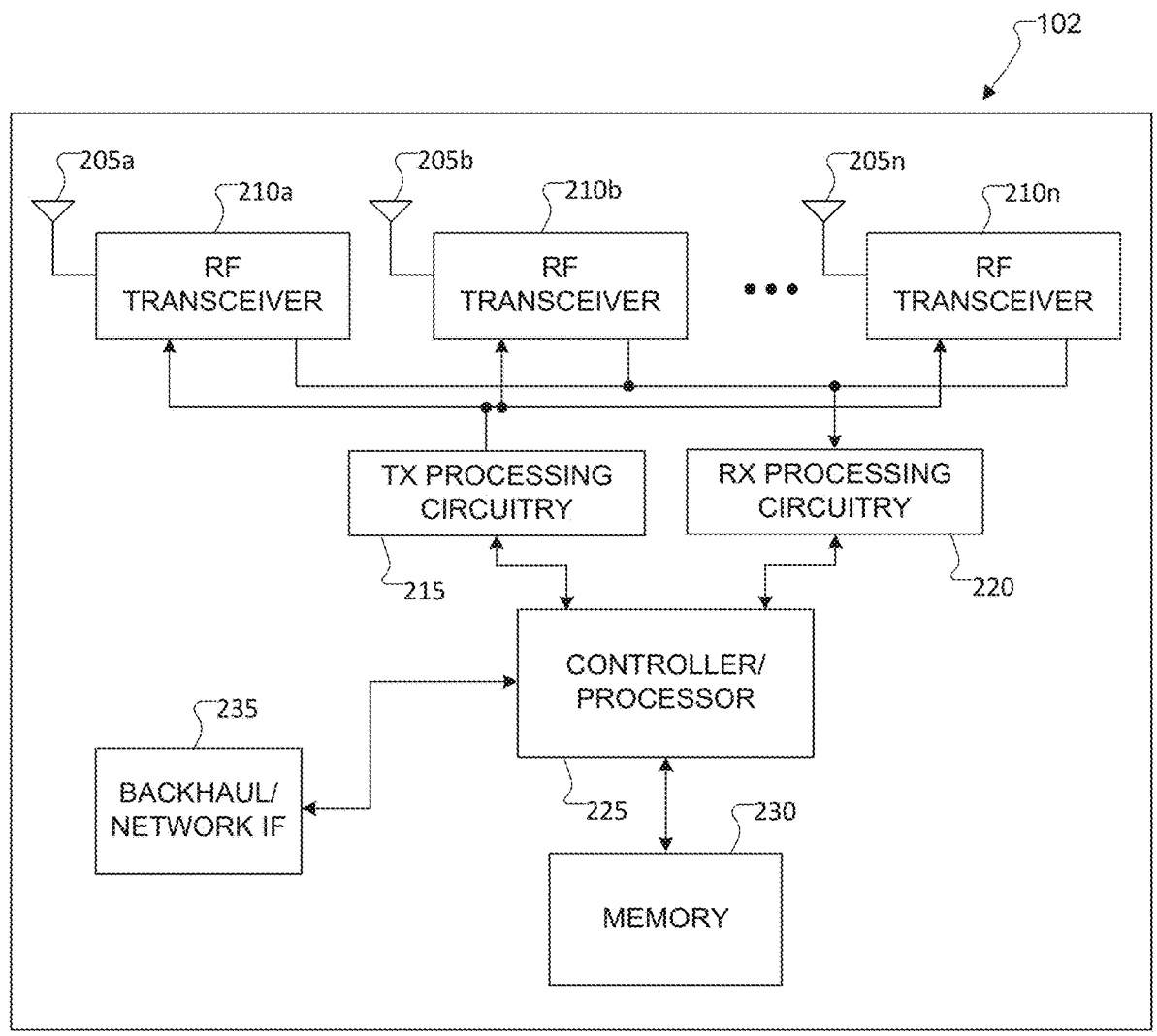
FIG. 2 illustrates an example gNB according to embodiments of the present disclosure.
Figure 3:
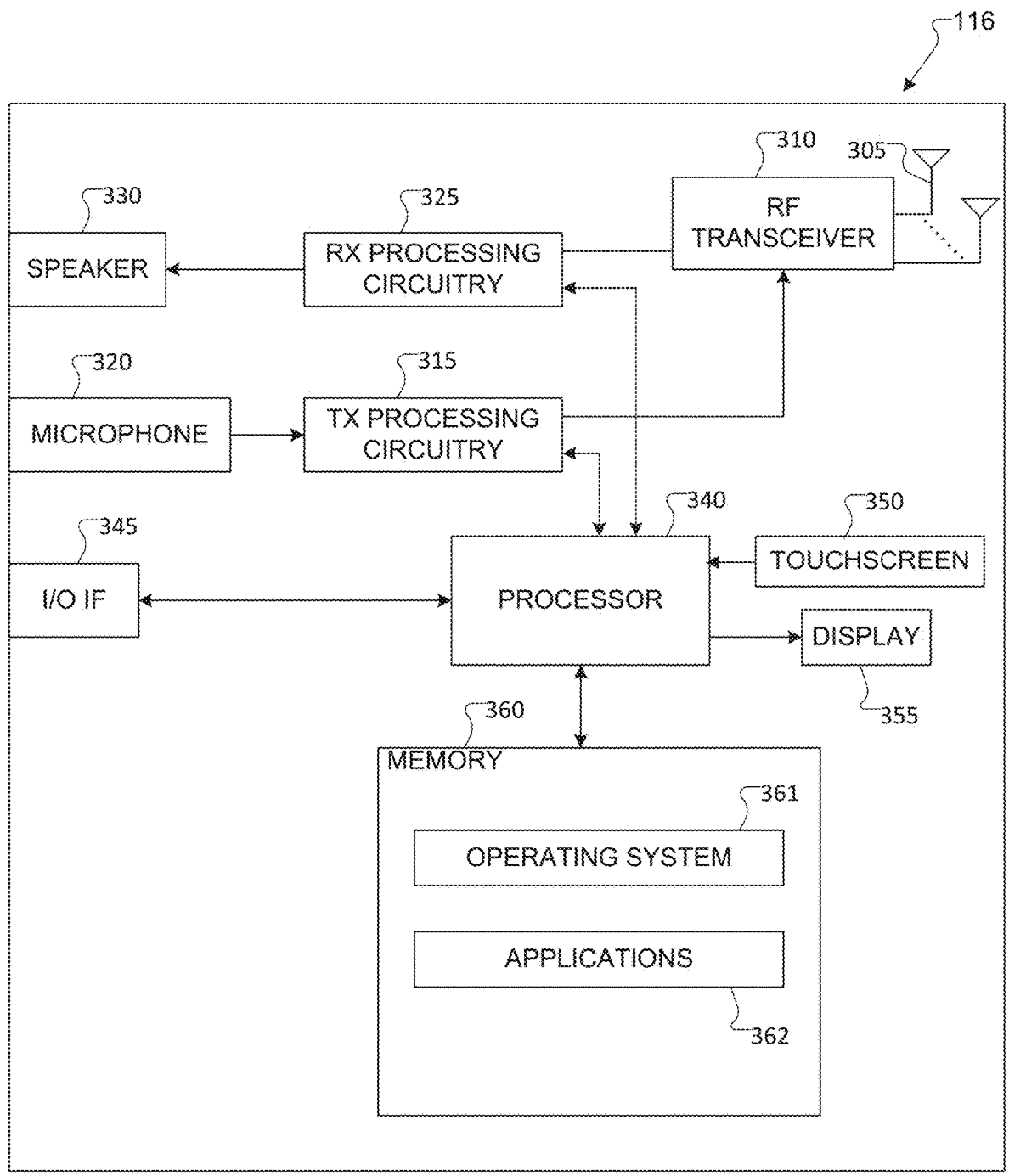
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only.

It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management, beamforming, and wireless communications on a 140 GHz link. In certain embodiments, and one or more of the gNBs 101-103 includes circuitry, programing, or a combination thereof for beam management, beamforming, and wireless communications on a 140 GHz link.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Furthermore, discussions on use cases and deployment scenarios for 5G NR systems operating beyond 52.6 GHz bands have already begun, and support for operation in these bands will be included in 3GPP Release 16. Following this trend, it is inevitable that telecommunications will utilize the terahertz (THz) bands for future wireless systems. Therefore, the 5G/NR or future 6G communication system will likely utilize a terahertz (THz) bands. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. The THz band is here defined as the frequencies ranging from 0.1 THz to 10 THz, which aligns with some publications such as. A total of 102 GHz spectrum in the range between 95 GHz and 300 GHz is being made accessible for licensed fixed point-to-point and mobile services through the Spectrum Horizon program. Accordingly, the extremely wideband THz channels with tens of GHz-wide bandwidth could potentially support the Tbps communication envisioned by the future 6G standard. The present disclosure may also be applied to deployment of 5G communication system, 6G or even later release that may use THz bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
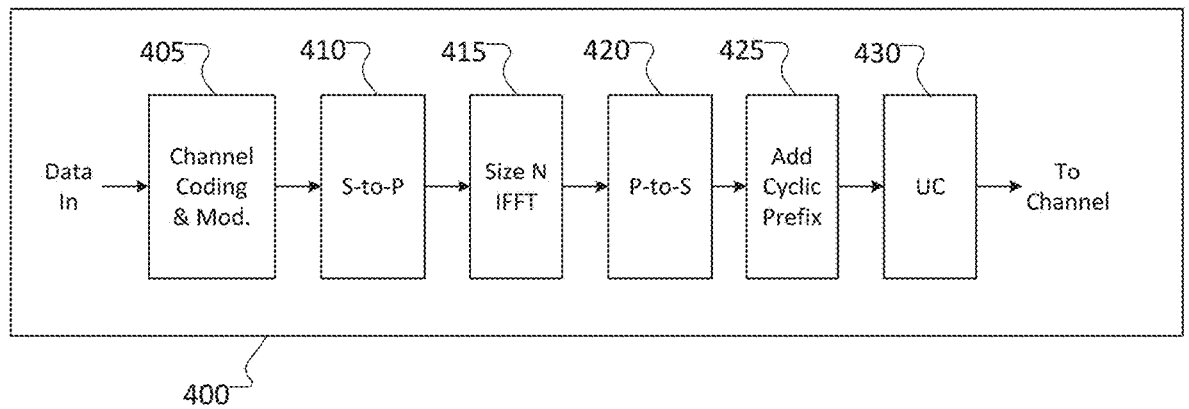
FIGS. 4 and 5 illustrate example wireless transmit and receive paths according to the present disclosure.
Figure 5:
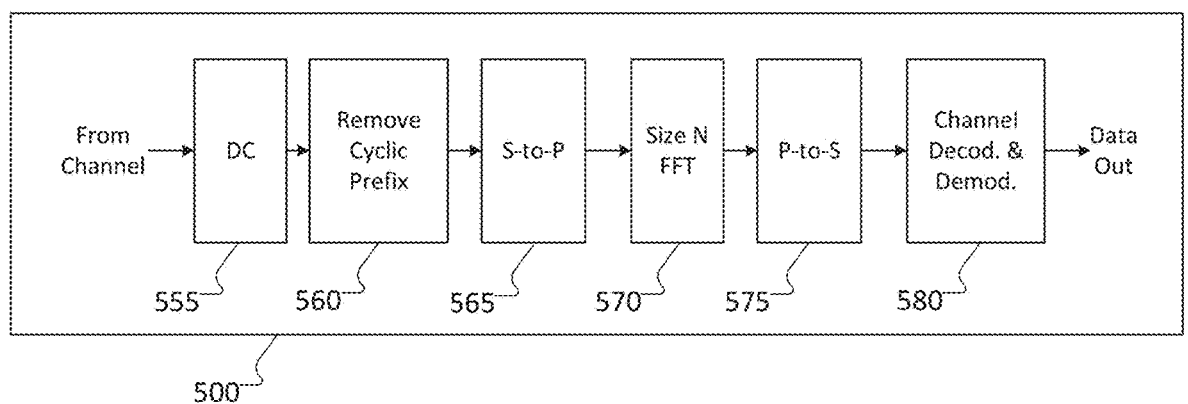

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support adapting a channel sensing threshold as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
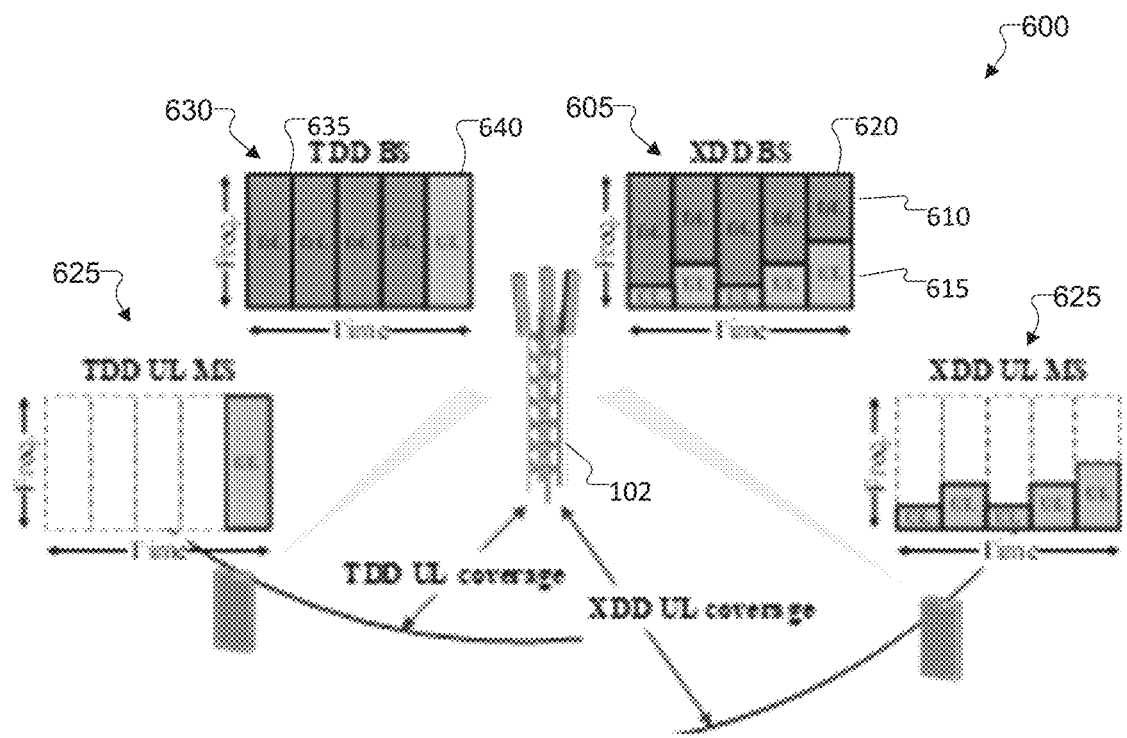
FIG. 6 illustrates an example of a cross-division duplex (XDD) system according to embodiments of the present disclosure.

FIG. 6 illustrates an example of a cross-division duplex (XDD) system according to embodiments of the present disclosure. An embodiment of the XDD system 600 shown in FIG. 6 is for illustration only. Other embodiments can be used without departing from the scope of the present disclosure.

A base station 102 is configured to transmit in XDD 605. XDD 605 is a new paradigm that provides a unique compromise between TDD and FDD, leveraging the benefits of both. In XDD operation, simultaneous DL 610 and UL 615 are performed in the same contiguous TDD band 620, gaining the benefits of FDD. The UE 116 is configured to transmit the UL in XDD 625. Additionally, the base station 102 can fall back to regular TDD 630 mode of operation in which the DL 610 occurs in certain time bands 635 and the UL 615 occurs in a different time band 640. The UE 116 also can fall back to transmitting the UL in TDD 645.

In certain embodiments, a duplexer is used in a TDD band, treating the TDD band like an FDD band. Using a duplexer in the TDD band would fix the location of the UL and DL frequencies and would not allow a flexible BW UL as shown in the example shown in FIG. 6. Furthermore, duplexers require a guardband to transition from passband to stopband. As such, a technique is required that would allow a flexible band UL operation simultaneously with the DL operation with minimal guardband.

In certain embodiments, a self-interference canceler (SIC) is a non-linear model. In certain systems with an SIC, a Volterra series or neural network is used to model the self-interference. In certain systems with an SIC, a generalized memory polynomial (GMP) can be used to model the self-interference. Due to the nature of GMP, the computational complexity increases exponentially with non-linearity (NL) order and memory depth implemented in the model. Especially for high power and wide-band signal, the non-linearity due to compression and further entangled with memory effect can make training a model with low NL order and memory depth difficult. Therefore, the trained model becomes quite computation-intensive and complex. Additionally, the trained model may fail to provide an excellent fit to the data and the residue, such as a least squares or mean square error, can be significant.

In certain embodiments of the present disclosure, an equalizer is placed before an SIC module. The placement of the equalizer in front of the SIC correct some distortion in RX signal first, including distortion incurred by channel and memory effect, and the like. This placement and associated distortion correction can improve the SIC model by using much lower NL order and memory depth, and better accuracy. Therefore, the purpose of the equalizer is to reduce the computational burden/complexity of the SIC. This equalizer could be implemented as a finite impulse response (FIR) filter, an infinite impulse response filter (IIR) or any other known methods of equalization such as frequency domain equalization. It is not limited in function to only shape the frequency response. It could also implement a low order polynomial to perform some nonlinearity compensation together with frequency shaping. The key idea is to use it as preprocessing or signal-conditioning stage prior to the main SIC block in order to reduce the overall complexity of the self-interference cancellation system.

Figure 7:
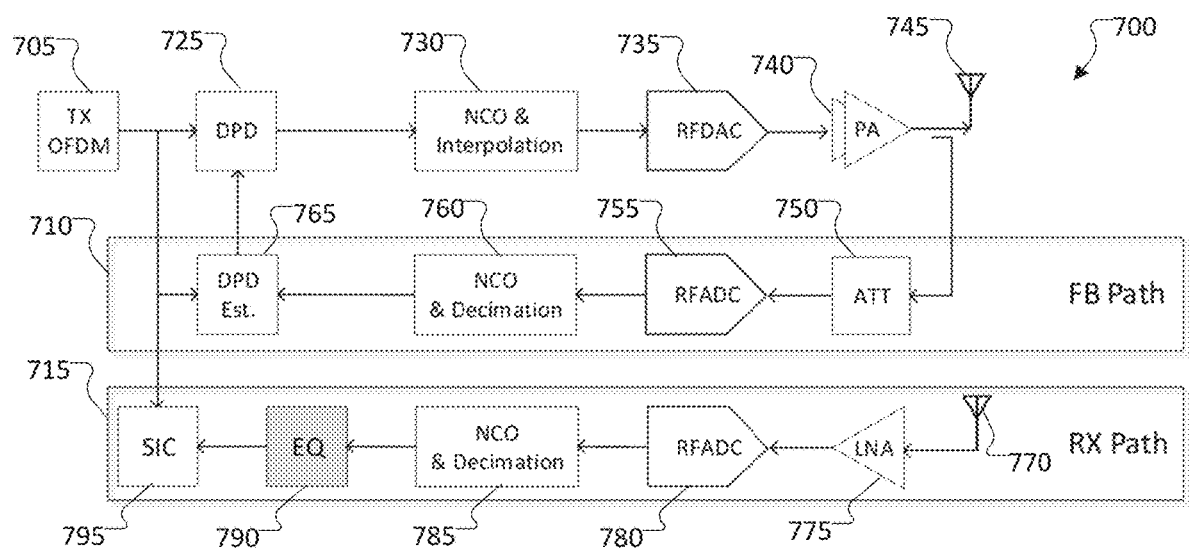
FIG. 7 illustrates an example transceiver system according to embodiments of the present disclosure.

FIG. 7 illustrates an example transceiver system according to embodiments of the present disclosure. The embodiment of the transceiver 700 shown in FIG. 7 is for illustration only. Other embodiments can be used without departing from the scope of the present disclosure. The transceiver 700 can be the same as or similar to transceiver 210 or transceiver 310.

In the example shown in FIG. 7, the transceiver 700 includes a transmit path that receives and transmits an OFDM signal 705. The transceiver 700 also includes a feedback (FB) path 710 that the receives a copy of the transmitted OFDM signal 705 and a receive (RX) path 715 that is configured to receive another signal. In certain embodiments, such as in XDD communication, the transceiver is configured to concurrently operate in the UL and the DL. In such scenarios, leakage from a signal transmitted by the transmit can overlap, in time and frequency bands, with a signal received by the receive path. For example, if the transmit path is transmitting in the DL and the receive path is concurrently receiving in the UL, the receive path may also receive a portion of the DL signal that is leaking over into the time and frequency bands being used for the UL since there is no guard band to separate the DL and UL communications.

The transmit path includes a digital predistortion module (DPD) 720, a numerically controlled oscillator (NCO) 725, a radio frequency-digital to analog converter (RF-DAC), a power amplifier (PA) 740, and a transmit (TX) antenna 745. The FB path 710 is coupled to the transmit antenna 745 and includes an attenuator (ATT) 750, a RF-analog to digital converter (RF-ADC) 755, a second NCO 760, and a DPD estimator (DPD Est.) 765. The RX path 715 is configured to receive a receive signal and includes a low noise amplifier, a down-conversion mixer, an analog baseband filter, an analog gain, and an A/D converter. For example, the RX path 715 includes a lower noise amplifier (LNA) 775, RF-ADC 780, a third NCO 785, an equalizer (EQ) 790, and self-interference canceler (SIC) 795. Each of the components illustrated in the example shown in FIG. 7 can be implemented by hardware and circuitry configured to perform the respective functions. For example, each of the DPD 725, DPD 765, EQ Est. 790, and SIC 795 can be implemented by suitable, hardware, circuitry, and processing circuitry to perform the respective functions. The EQ Est. 790 is located before the SIC 795 to alleviate the frequency response introduced due to a channel distortion that may occur between the TX antenna 745 and the RX antenna 770. The channel distortion can be learned via the FB path 710 and the RX path 715. For example, the EQ Est. 790 is configured to equalize a memory effect ($h_1$) and channel ($h_2$). That is, EQ Est. 790 can equalize $h_1 \times h_2$ using a linear filter.

Additionally, the FB path 710 is configured as a training path to estimate non-linearity coefficients for use by the DPD 725. For example, the DPD Est. 765 is configured to estimate a non-linear component corresponding to a transmit path. It is noted that digital pre-distortion is usually for PA linearization. The DPD 725 pre-distorts the TX signal so that, after passing through the PA, the adjacent channel leakage power (ACP) is smaller. Additionally, the SIC 795 is configured to reproduce the leakage at the PA 740 output and subtract the leakage from the received signal.

Figure 8:
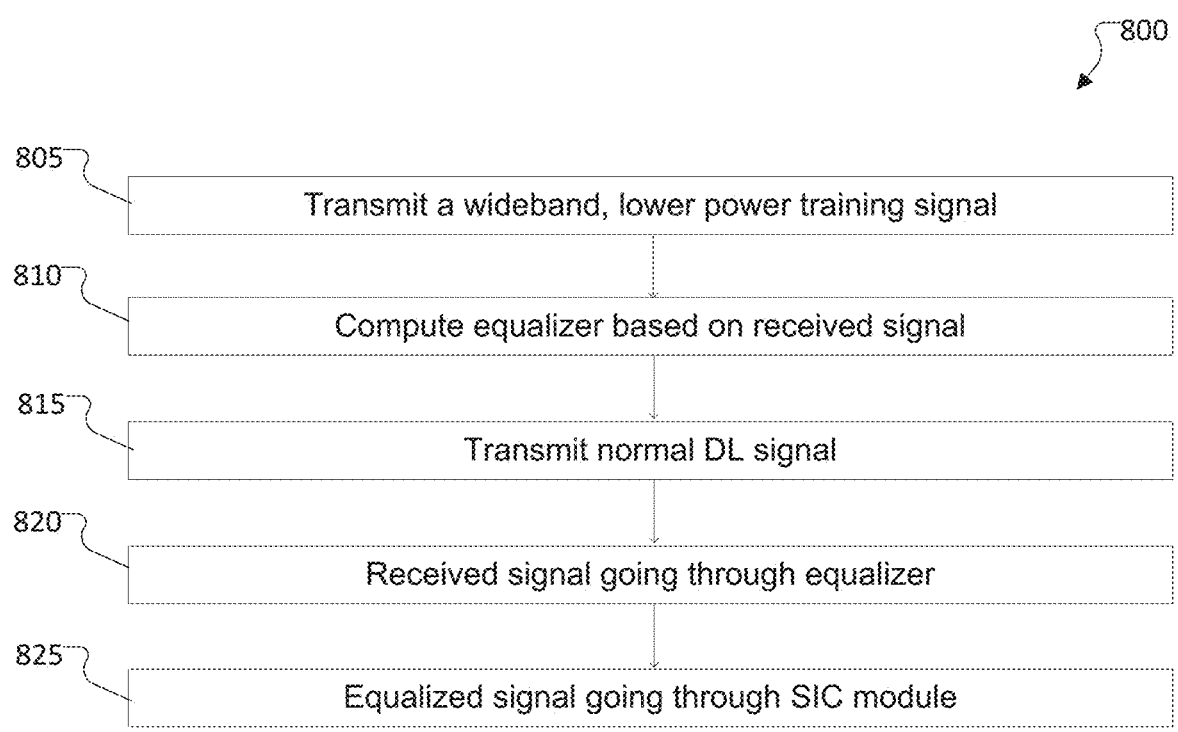
FIG. 8 illustrates a flow chart of a process for self-interference cancelation according to embodiments of the present disclosure.

FIG. 8 illustrates a flow chart of a process 800 for self-interference cancelation according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station or base station.

In the process 800 shown in FIG. 8, operations can be separated into two stages: a training stage and an operation stage. The training stage includes operation 805 and operation 810 while the operation stage includes operation 815, operation 820, and operation 825. In operation 805, a training signal is transmitted. The training signal should be low power and wideband in order to avoid compression and to cover all interested bands. In operation 810, an equalizer is computed based on received training signal. For example, the signal model can be according to Equation 1 below:

$$y = H^* x + n, \quad (1)$$

In Equation 1, x is transmitted signal, y is received signal, n is Gaussian noise, and H is the channel response. In certain embodiments, the equalizer 735 is a minimum mean square error (MMSE) equalizer. The equalizer 735 is configured to solve:

$$\min E\{\|C^H y - x\|^2\}, \quad (2)$$

In Equation 2, C is an optimal solution that makes a MMSE equalizer. The value for C can be solved using Equation 3:

$$C = H^H (H \cdot H^H + \sigma_n^2 I)^{-1}, \quad (3)$$

After the value for C is computed, C will be updated in real time to adapt to any changes in the real transmission channel.

In the operation stage, a normal TX signal will be transmitted and received. That is, in operation 815, a normal DL signal is transmitted. In operation 820, the signal is received and processed through the equalizer computed in operation 810 in the training stage. Thereafter, the equalized signal output from the EQ is input into the SIC module for self-interference cancellation in operation 825.

Certain embodiments of the present disclosure provide an architecture to learn the equalizer at lower output power of the transmitter such that the TX is very linear and equalizer coefficients minimize the MSE (or LSE if a least squares solution is used) of the frequency response only.

Once the equalizer has been computed and applied, the frequency response of the transceiver 700 shown in FIG. 7 is flattened. Next, a DPD (and generalized memory polynomial) and SIC are applied to reduce the DL TX leakage in the RX band to the level of the noise floor.

Figure 9:
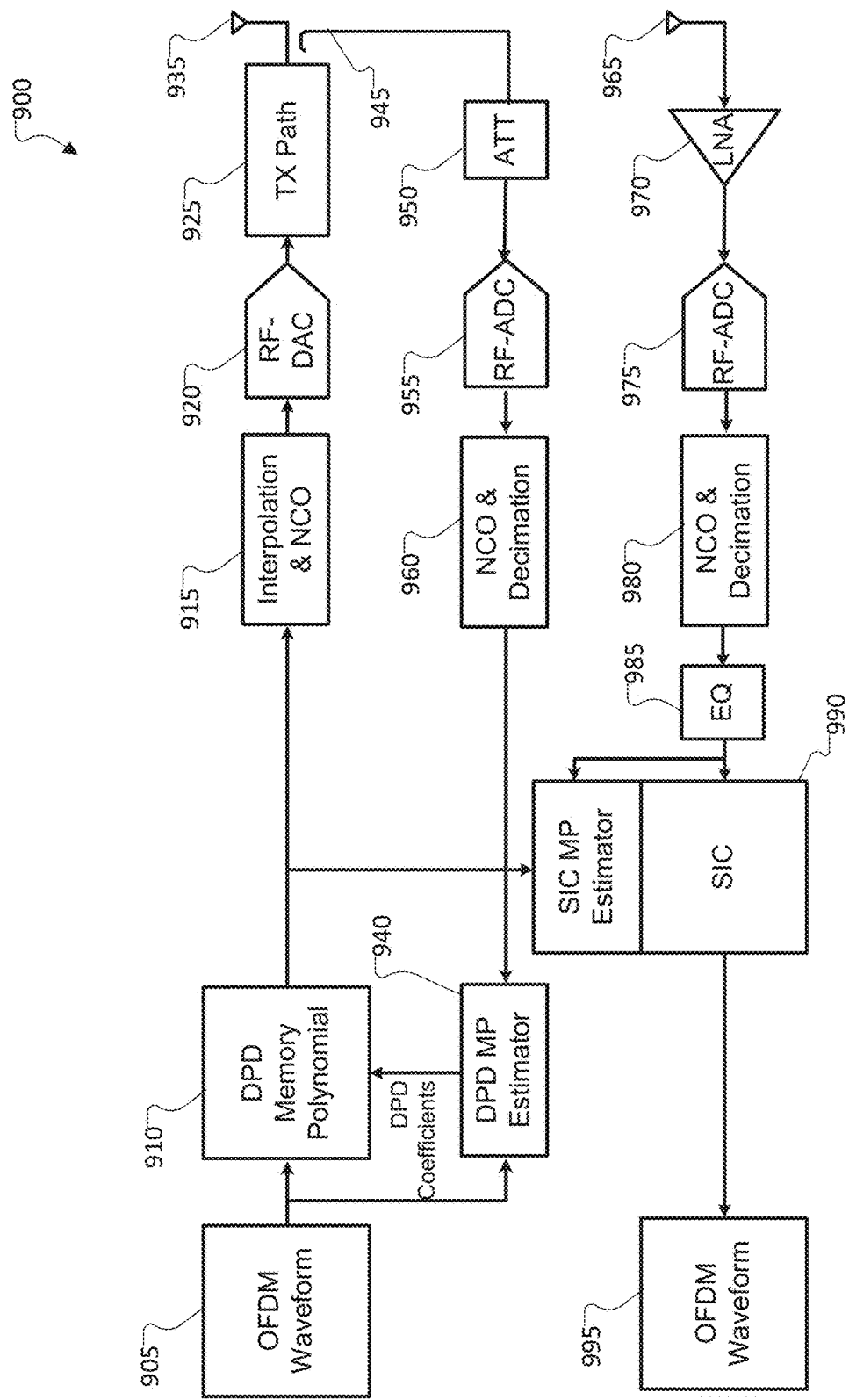
FIG. 9 illustrates an example assisted polynomial based linearity enhancement and self-interference canceler system according to embodiments of the present disclosure.

FIG. 9 illustrates an example assisted polynomial based linearity enhancement and self-interference canceler system according to embodiments of the present disclosure. The embodiment of the system 900 shown in FIG. 9 is for illustration only. Other embodiments can be used without departing from the scope of the present disclosure. The system 900 can be the same as or similar to transceiver 210 or transceiver 310.

In the example shown in FIG. 9, the assisted polynomial based linearity enhancement and self-interference canceler system 900 includes receives an OFDM Waveform 905. The TX OFDM waveform 905 is passed through a DPD 910 memory polynomial and up-sampled in an interpolation & NCO circuit 915 before applying to an RF-DAC 920. A TX gain, such as PA drivers and PA, constitute the transmit path 925 coupled to the TX antenna 935. The transmit path 925 generates the nonlinearity that spills over from the DL to the UL band and enters the RX antenna 965 due to finite isolation between the TX antenna 935 and the RX antenna 965. A coupler 945 followed by an attenuator (ATT) 950 provides an attenuated PA output to an RF-ADC 955. The RF-ADC 955 digitizes the attenuated PA output to an RF sampling rate. A second interpolation & NCO circuit 960 down-samples the signal output from RF-ADC 955. The down-sampled signal is provided to DPD MP Estimator 940, which also receives the OFDM Waveform 905. The DPD MP Estimator 965 uses the down-sampled signal to estimate the DPD coefficients for PA predistortion. These DPD coefficients are then applied to the DPD 910 memory polynomial and the TX path 925 is linearized. The linearization can be verified by a subsequent capture of the signal from the coupler path 945 and running an FFT to calculate an adjacent channel leakage ratio (ACLR) with and without DPD 910.

Next, the RF signal coupling to the RX antenna 965 is gained by one or more stages of LNA 970 and provided to RF-ADC 975. The digitized RF signal output from RF-ADC 975 is processed by a third interpolation & NCO circuit 980 to pass through an estimated equalizer 985 and SIC MP Estimator 990. The SIC MP Estimator 990 computes SIC MP coefficients. The SIC coefficients are then applied to produce a canceling signal that is fed to SIC to reduce the residue to the noise floor of the RX and to output the OFDM Waveform 995.

In certain embodiments, the DPD 940 is configured as follows. In certain embodiments, DPD 940 is a non-linear model. In certain systems, a Volterra series or neural network is used to model the digital pre-distortion. In certain systems, a generalized memory polynomial (GMP) can be used to model the digital predistorter (DPD 940). The GMP model is more appropriately pre-distorting the signal x from OFDM Waveform 905 to interpolation & NCO circuit 915 and RF-DAC 920 and the TX path (including the PA) such that the signal at the PA output is more linear representation of the ideal TX signal x produced by OFDM Waveform 905. That is, the output of DPD 910 causes the output of TX path 925 to have higher ACLR, causing a lower signal power in the adjacent band. The GMP is a polynomial that models an inverse of nonlinearities in the TX path 945 including a distortion created by RF-DAC 920, memory effects, and cross-memory effects in the PA. The output for sample n of the distorter, $\hat{x}(n)$, is shown Equation 4:

$$\hat{x}(n) = \sum_{p \in P_a} \sum_{m \in M_a} a_{p,m} x(n-m) |x(n-m)|^{p-1} + \quad (4)$$
$$\sum_{p \in P_b} \sum_{m \in M_b} \sum_{l \in L_b} b_{p,m,l} x(n-m) |x(n-m-l)|^{p-1} +$$
$$\sum_{p \in P_c} \sum_{m \in M_c} \sum_{l \in L_c} c_{p,m,l} x(n-m) |x(n-m+l)|^{p-1}$$

In Equation 4, a, b, and c represent coefficients for the polynomial, p is a polynomial degree chosen from the sets P, m is a memory depth from the set of memory depths M, l is a lag/lead term from the set L, and x(n) is the input of sample n to DPD 910.

In certain embodiments, to learn each of the coefficients, an indirect learning architecture (ILA) with least-squares (LS) learning is utilized. In the ILA, the output of the PA, y(n), is fed into a post-distorter GMP block with output $\hat{y}(n)$. The main concept is to learn the coefficients that minimize the least-square error between the output of the post-distorter and the output of the pre-distorter. The value β can be a vector of all the GMP coefficients in the post-distorter. Then the optimal GMP coefficients, $\hat{\beta}$, are given by the LS procedure as:

$$\hat{\beta} = \mathrm{argmin}_\beta \|\hat{x}(n) - \hat{y}(n)\| = (Y^H Y)^{-1} Y^H \hat{x} \quad (5)$$

In Equation 5, Y is a matrix representation of the GMP in which columns correspond to functions of the polynomial so that a dot product of Y and β yields $\hat{y} = [\hat{y}(0) \ldots \hat{y}(N-1)]^T$, where N is the number of samples in the signal. Once $\hat{\beta}$, is calculated, it is copied to the distorter GMP, and the procedure can be repeated until $\hat{\beta}$ converges and is stable. A Tikhonov regularization is utilized to improve the numerical stability of the LS calculation. This method places a small penalty on the magnitude of each element of β. This regularization also has the advantage of learning DPD coefficients that are in a dynamic range more suitable to FPGA implementations. After estimating the DPD coefficients, the coefficients are applied to produce the results of DPD 940. The residual nonlinearity is removed by running SIC 990.

In certain embodiments, the SIC 990 is configured as follows. In the case of self-interference cancellation, a similar GMP polynomial can be used. Instead of calculating a pre-inverse model of the PA, the goal is to calculate a forward model of the PA. Given that the input and output signals of the PA are known, the LS system can be solved directly without an ILA by using the method of Equation 5.

In certain embodiments, the DPD and SIC coefficients are estimated without the equalizer 985 and then the residual error is evaluated. If the error exceeds a predetermined limit, the transceiver system 900 computes the equalizer at a low power and applies the equalizer before proceeding to DPD and SIC coefficient estimation. In certain embodiments, a high order GMP is used in place of the equalizer 985. Both the forward model and the inverse model are represented by GMP of Equation 4 as the inverse of a polynomial is also a polynomial. A direct method to compute the inverse model of a polynomial could be used or a LS procedure be used to solve for the coefficients.

Figure 10:
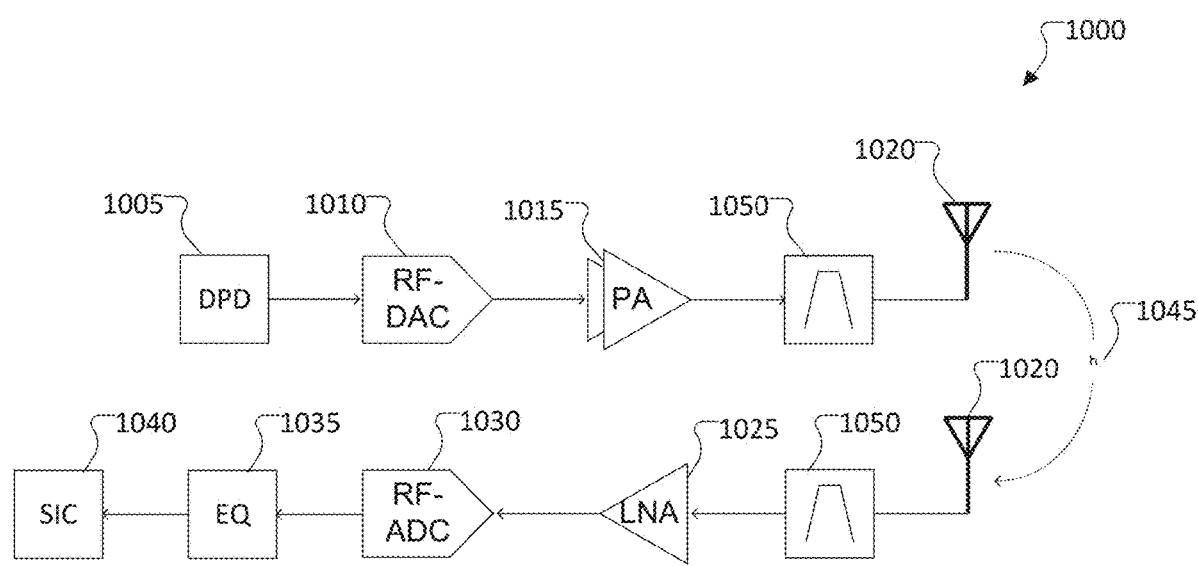
FIG. 10 illustrates an example transceiver system according to embodiments of the present disclosure.

FIG. 10 illustrates an example transceiver system according to embodiments of the present disclosure. The embodiment of the transceiver 700 shown in FIG. 7 is for illustration only. Other embodiments can be used without departing from the scope of the present disclosure. The transceiver 1000 can be the same as or similar to transceiver 210 or transceiver 310.

In the example shown in FIG. 7, the transceiver 1000 includes digital predistortion module (DPD) 1005, digital-to-analog converter (DAC) 1010, power amplifier (PA) 1015, antennas 1020, lower noise amplifier (LNA) 1025, analog-to-digital converter (ADC) 1030, equalizer (EQ) 1035, and self-interference canceler (SIC) 1040. Each of the components illustrated in the example shown in FIG. 10 can be implemented by hardware and circuitry configured to perform the respective functions. For example, each of the DPD module 1005, EQ 1035, and SIC 1040 can be implemented by suitable, hardware, circuitry, and processing circuitry to perform the respective functions. The DPD module 1005 reduces the intermodulation (IMD) and leakage at PA 1015 output, which will limit the leakage from DL TX band to DL RX band, while SIC 1040 will further cancel the TX-to-RX leakage and intermodulation signal.

In certain embodiments, for high power wideband efficient TX, the PA 1015 is operated at close to 1 decibel (dB) compression point (P1 dB). Operating the PA 1015 at P1 dB can introduce intermodulation components into the TX signal output due to nonlinearities. The introduction of intermodulation components could be avoided by backing off the output power of the PA 1015. It is noted that backing off the output power of the PA 1015 can be impractical as it reduces the coverage area and requires many more base stations to be deployed to cover the same area. Additionally, the PA 1015 is very inefficient at lower output powers. The nonlinearities generate spill over power in the adjacent bands. This energy is further entangled with distortion incurred by memory effect of PA, channel, and filters.

Products from nonlinearities and distortion due to non-linear TX output are also present in the RX signal band that need to be removed using self-interference cancellation (SIC) techniques. Generally, a very complex SIC model with high NL order and memory depth is required to cancel the self-interference.

Certain embodiments of the present disclosure provide a design in which an equalizer is located before SIC module 1040. Placement of the EQ 1035 before the SIC module 1040 can correct some distortions incurred by memory effect of PA 1015, channel 1045, and filters 1050. In certain embodiments, filters 1050 can be field programmable gate arrays (FPGAs) such as from XILINX. This operation will much ease SIC model complexity with lower memory depth, lower NL order, and better cancellation performance. The design of the equalizer 1035 is a reversal of the distortion due to channel 1045, and filters 1050, and will render the baseband frequency response flat.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
   a transceiver configured to communicate via an uplink channel and a downlink channel concurrently;
   a transmit antenna;
   a receive antenna; and
   a processor configured to:
      estimate a non-linear component corresponding to a transmit path in the transceiver;
      apply an equalizer function to a received signal, wherein the equalizer function is calculated based on a training signal that is transmitted at a low power such that the transmitted training signal is substantially linear; and
      subtract, in a self-interference cancel (SIC) circuitry, the estimated non-linear component from the equalized signal.

2. The apparatus of claim 1, wherein the non-linear component comprises a generalized memory polynomial (GMP).

3. The apparatus of claim 2, wherein the GMP is configured to model a digital pre-distortion module and power amplifier in the transmit path.

4. The apparatus of claim 1, wherein the non-linear component is estimated based on a feedback signal from the transmit path and is provided to a digital pre-distortion module.

5. The apparatus of claim 1, further comprising one or more filters configured to filter a transmit signal or the received signal.

6. The apparatus of claim 1, further comprising a feedback path coupled to the transmit antenna, the feedback path comprising:
   a radio frequency (RF) coupler with an attenuation circuit;
   a RF receiver path; and
   a digital pre-distortion estimation circuit configured to estimate the non-linear component.

7. The apparatus of claim 1, wherein the equalizer function is calculated such that it reduces distortions due to memory effects of the transmit path and a channel between the transmit antenna and the receive antenna such that a non-linearity order and memory depth of the SIC circuitry can be lowered.

8. A method comprising:
   transmitting, by a transceiver configured to transmit an uplink channel and receive a downlink channel concurrently, one or more signals, the transceiver coupled to a transmit antenna and a receive antenna;
estimating a non-linear component corresponding to a transmit path in the transceiver;
applying an equalizer function to a received signal, wherein the equalizer function is calculated based on a training signal that is transmitted at a low power such that the transmitted training signal is substantially linear; and
subtracting, in a self-interference cancel (SIC) circuitry, the estimated non-linear component from the equalized signal.

9. The method of claim 8, wherein the non-linear component comprises a generalized memory polynomial (GMP).

10. The method of claim 9, wherein the GMP is configured to model a digital pre-distortion module and power amplifier in the transmit path.

11. The method of claim 8, wherein the non-linear component is estimated based on a feedback signal from the transmit path and is provided to a digital pre-distortion module.

12. The method of claim 8, further comprising filtering, by one or more filters, the one or more signals or a received signal.

13. The method of claim 8, further comprising receiving, by a feedback path coupled to the transmit antenna, the one or more signals, the feedback path comprising:
a radio frequency (RF) coupler with an attenuation circuit;
a RF receiver path; and
a digital pre-distortion estimation circuit configured to estimate the non-linear component.

14. The method of claim 8, wherein the equalizer function is calculated such that it reduces distortions due to memory effects of the transmit path and a channel between the transmit antenna and the receive antenna such that a non-linearity order and memory depth of the SIC circuitry can be lowered.

15. A non-transitory computer readable medium comprising a plurality of instructions that, when executed by at least one processor, cause the processor to:
transmit, via a transceiver configured to communicate via an uplink channel and a downlink channel concurrently, one or more signals, the transceiver coupled to a transmit antenna and a receive antenna;
estimate a non-linear component corresponding to a transmit path in the transceiver;
apply an equalizer function to a received signal, wherein the equalizer function is calculated based on a training signal that is transmitted at a low power such that the transmitted training signal is substantially linear; and
subtract, in a self-interference cancel (SIC) circuitry, the estimated non-linear component from the equalized signal.

16. The non-transitory computer readable medium of claim 15, wherein the non-linear component comprises a generalized memory polynomial (GMP).

17. The non-transitory computer readable medium of claim 16, wherein the GMP is configured to model a digital pre-distortion module and power amplifier in the transmit path.

18. The non-transitory computer readable medium of claim 15, wherein the non-linear component is estimated based on a feedback signal from the transmit path and is provided to a digital pre-distortion module.

19. The non-transitory computer readable medium of claim 15, wherein the plurality of instructions is further configured to cause the processor to:
filter, via one or more filters, the one or more signals or a received signal.

20. The non-transitory computer readable medium of claim 15, wherein the plurality of instructions is further configured to cause the processor to:
receive, via a feedback path coupled to the transmit antenna, the one or more signals, the feedback path comprising:
a radio frequency (RF) coupler with an attenuation circuit;
a RF receiver path; and
a digital pre-distortion estimation circuit configured to estimate the non-linear component,
wherein the equalizer function is calculated such that it reduces distortions due to memory effects of the transmit path and a channel between the transmit antenna and the receive antenna such that a non-linearity order and memory depth of the SIC circuitry can be lowered.

* * * * *